April 13, 1943.    W. R. ROYER    2,316,718
TIRE CHAIN
Filed Sept. 8, 1939

INVENTOR
WILLIAM R. ROYER
BY
Emery, Varney, Whittemore & Dix
ATTORNEYS

UNITED STATES PATENT OFFICE 2,316,718

TIRE CHAIN

William R. Royer, Wilkes-Barre, Pa.

Application September 8, 1939, Serial No. 293,907

8 Claims. (Cl. 152—213)

This invention relates to tire chains and has for an object the provision of an improved chain which may easily be put on and taken off the tire.

The common tire chain comprises parallel circumferential or side chains and cross chains, the assembly when laid out flat having the appearance of a ladder.

These chains are difficult to apply, particularly with fenders having deep wells which are found on the newer cars. Most car users are well acquainted with several methods of placing the chains on the tires and realize that it is difficult to connect the loose ends of the chains, particularly on the rear side of the tire. Also the cross chains catch on the tire, particularly when pulling upward and it is difficult for one person to draw the ends of the side chains together while shifting the cross chains along to permit the ends to come together.

It is also difficult to locate the ends of the chains, both when applying and when stored in the car. The trouble is especially bad in the latter case because the chains become highly entangled in the car and it may require some time to untangle them.

According to the present invention elastic coupling members are provided for the side chains to assist in locating the loose ends and to aid in bringing the loose ends together on the tire. In addition, the device may assist in keeping the chain in proper position during use. It is preferred that the device become a permanent part of the chain, though it may be applied to existing chains as an accessory or be removed from the chain or be shifted in position on the chain as desired.

One embodiment of the invention will be described by reference to the accompanying drawing, wherein.

Figure 5:
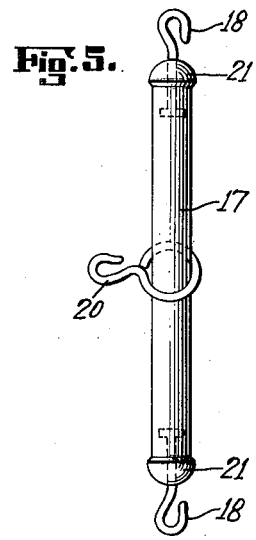

Fig. 5 in an enlarged side view of one of the connecting devices alone; and

Figure 6:

Fig. 6 is an enlarged side view of a modified form of connecting device.

Figure 1:
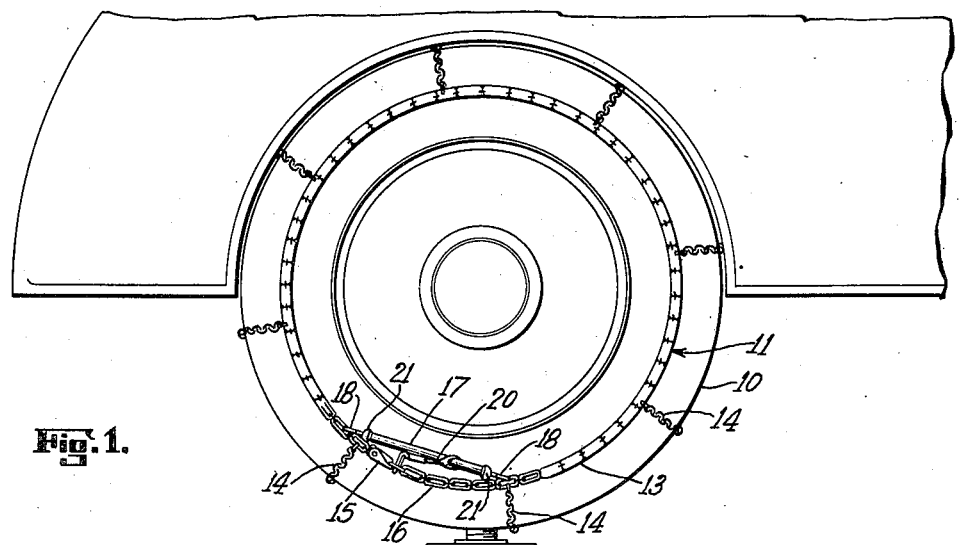
Fig. 1 is a side elevation of the improved chain on a tire.
Figure 3:
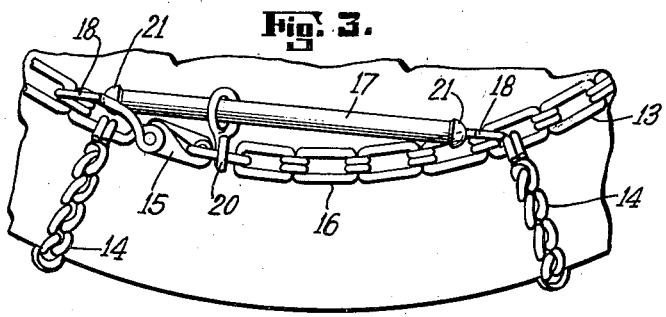
Fig. 3 is a partial view similar to Fig. 1 but showing the chain ends connected in a slightly different way.
Figure 4:
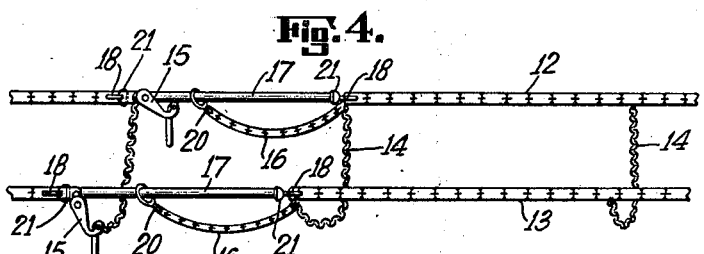
Fig. 4 is a view of part of the chain laid out flat, one side chain being slightly displaced longitudinally from normal operating position for clarity of illustration.

Referring to the drawing, a tire 10 is shown equipped with an anti-skid chain device 11. As shown in Fig. 4, the chain device comprises a rear or inner circumferential chain 12, a front or outer circumferential chain 13, and a plurality of cross chains 14. Grip-locks or clasps 15 are secured to one free end of the side chains 12, 13, preferably very near the last cross chain 14. A number of links, comprising loose ends 16, extend beyond the last cross chain at the other end of the side chains. The grip-locks 15 are adapted to engage the end link of the loose ends, as shown in Fig. 3, or any following link, as may be necessary to tighten the chain device upon the tire sufficiently. In Fig. 1 it is shown engaged with the third link from the end.

To the side chains 12, 13 spanning the ends there are secured resilient coupling members 17 provided at their ends with rings, hooks or the like 18 for attaching them to links of the side chains. One of these devices is shown in Fig. 5. Preferably it is formed of live rubber, though it may be of other resilient material. In the form shown in Fig. 5 the resilient member 17 is circular in cross section and is molded about the inner ends of the hooks 18.

The hooks may be closed after being engaged with the desired links of the chain and thereafter the resilient member becomes a permanent part of the chain device. The hooks may be opened when the resilient member is to be removed or shifted. The device may remain in place even if the hooks are not closed because of the tension maintained therein. Or snap hooks may be used if desired.

In order to locate and keep in place the loose links at the end of the chains, a hook 20 is secured to the member 17 intermediate its ends. The hook may include an eye which is slidably adjustable along the member 17, the eye being retained by enlarged ends 21 on the member. The hooks 20 are engaged with the end links and move along the member 17 to any position necessary, as shown in Fig. 1. The ends of the chains are thus brought readily to hand merely by picking up the resilient members 17.

Assuming that the wheel has been raised on a jack, as shown in Fig. 1, the chain device is draped over the top of the tire with the ends of about equal length. The resilient member for the rear side chain is then stretched and snapped over the bottom of the tire. The chain is adjusted as required, the resilient members pulling the ends together during adjustment. The wheel is turned to bring the ends into convenient position and the rear grip-lock 15 is secured in the desired link in the free end of the chain on the rear or inner side of the tire. Then the grip-lock on the front side is engaged.

Figure 2:
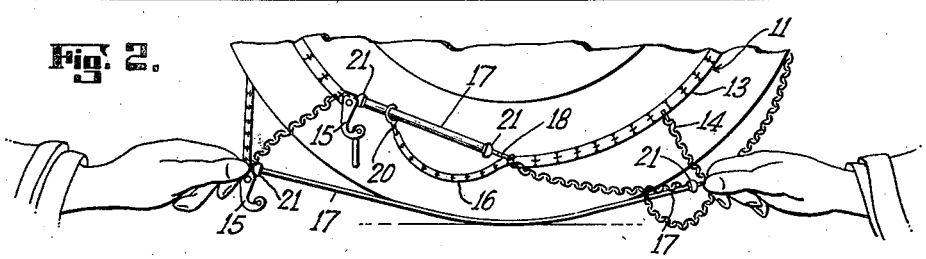
Fig. 2 is a similar view showing the chain being applied to the tire.

If the wheel is not jacked up, the resilient member is stretched to about the position shown in Fig. 2 and released to engage the bottom of the tire just in front of its point of contact with the ground. The member and tire, both being of frictional material, assures that the parts will remain in this position until shifted. The wheel is rolled forward until the top or center part of the chain device is near the ground, whereupon the ends of the rear chain are brought clear and are snapped over the tire to the rear side. The grip-locks are then brought into a convenient position and the rear chain connected, after which the front chain is connected. The resilient member being round in cross section is easily rolled over the crown of the tire.

It may, however, be desirable to make the resilient member of a different cross section. It may, for example, be made in the form of a flat band 17' which is provided with end rings 18' and a slidable hook 20'. The band may be an endless member consisting of two parallel flat portions, the rings being secured in the ends of the loop thus formed. The end rings are made large enough to prevent the slidable loop of the hook 20' from coming off.

When the loose ends of the chains are thus held they cannot beat upon the pavement or fenders and create the noise which is such a common nuisance with chains, apart from broken cross links.

These resilient chain coupling devices may be sold with new chains or may be applied to chains already in use. They are simple and inexpensive and of great assistance in applying chain devices to tires, keeping chains from tangling and helping to locate the ends after being out of use, and assist the action of the chains in use. The resilient links make the side chains continuous at all times, whether the chain grip-locks are secured or not.

While only one embodiment of the invention has been described it is to be understood that the invention may have various embodiments within the limits of the prior art and the scope of the subjoined claims.

I claim:

1. A tire chain device, comprising in combination, side chains and cross chains, a resilient coupling member connected to one end of each side chain and connected at a distance from the other ends so as to be under tension when the chain is in operative position on the tire, said coupling members being formed of round live rubber stock with connecting devices firmly secured in their ends and being of sufficient length and resiliency to stretch to pass over the tire with a permissible rolling action but to hold a placed position on the tire by friction.

2. A tire chain device, comprising in combination, side chains having grip-locks at one end and loose lengths at the other end, cross chains between the side chains, and resilient coupling members for each side chain, said coupling members being permanently connected at one end immediately behind the grip-locks and at the other end at a distance from the ends so as to be under tension when the chain is in operative position on the tire, said members being formed of rubber having sufficient length and expansion to permit snapping over the tire and to hold a placed position on the tire by friction.

3. A tire chain device comprising in combination, side chains having grip-locks for connecting the ends and loose lengths at one end, cross chains between the side chains, and resilient coupling members for each side chain, each of said coupling members being connected at one end to one end of a side chain, at the other end at a distance from the end of a loose length on the other end of a side chain, and intermediate its length to a point adjacent the end of the loose length, the intermediate connection providing longitudinal movement along the length of the coupling member.

4. A tire chain device comprising in combination, side chains having grip-locks at one end and loose lengths at the other end, cross chains between the side chains, and resilient coupling members for each side chain, each of said coupling members being connected at one end adjacent the grip-locks, at the other end at a distance from the end of the loose lengths, and intermediate its length to a point adjacent the end of the loose lengths, the connection between the intermediate portion of the coupling members and the end of the loose lengths comprising a retaining member which is shiftable along the length of the coupling members.

5. A tire chain device comprising in combination, side chains having grip-locks at one end and loose lengths at the other end, cross chains between the side chains, and resilient coupling members for each side chain, each of said coupling members being connected at one end adjacent the grip-locks, at the other end at a distance from the end of the loose lengths, and intermediate its length to a point adjacent the end of the loose lengths, the connection between the intermediate portion of the coupling members and the end of the loose lengths comprising a hook-and-eye member, the hook engaging a link of the chain and the eye being slidable along the coupling member.

6. A tire chain device comprising in combination, side chains having grip-locks at one end and loose lengths at the other end, cross chains between the side chains, and resilient coupling members for each side chain, each of said coupling members being connected at one end adjacent the grip-locks, at the other end at a distance from the end of the loose lengths, and intermediate its length to a point adjacent the end of the loose lengths, the connection between the intermediate portion of the coupling members and the end of the loose lengths comprising a hook-and-eye member, the hook engaging a link of the chain and the eye being slidable along the coupling member, and means at the ends of said coupling member for retaining said hook.

7. A tire chain device, comprising in combination, side chains and cross chains, and resilient coupling members each connected at its ends to a side chain near its ends to be under tension when the chain is in operative position on the tire with its ends connected and being connected intermediate its ends to one end of the side chain at all times to facilitate location thereof for application and avoid undue free movement thereof in use, the intermediate connection providing longitudinal movement along the length of the coupling member.

8. A tire chain device, comprising in combination, side chains having grip-locks at one end and loose lengths at the other end, cross chains between the side chains, round rubber bands having hooks anchored in each end, one hook being attached to the side chains near the grip-locks and the other hook being attached to the side chains at a distance from the ends to place the bands under tension in use, and a hook slidably mounted by an eye on said band and engaged with the ends of said loose lengths.

WILLIAM R. ROYER.